US012736786B2

(12) United States Patent
Epple

(10) Patent No.: US 12,736,786 B2
(45) Date of Patent: Sep. 15, 2026

(54) OPTICAL ARRANGEMENT FOR A MOBILE DEVICE WITH A CURVED DETECTOR SURFACE

(71) Applicant: Carl Zeiss AG, Oberkochen (DE)

(72) Inventor: Alexander Epple, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 250 days.

(21) Appl. No.: 18/374,485

(22) Filed: Sep. 28, 2023

(65) Prior Publication Data

US 2024/0111208 A1 Apr. 4, 2024

(30) Foreign Application Priority Data

Sep. 28, 2022 (DE) ..................... 10 2022 124 982.4

(51) Int. Cl.

| | |
|---|---|
| ***G03B 17/04*** | (2021.01) |
| ***G02B 13/00*** | (2006.01) |
| ***G02B 13/06*** | (2006.01) |
| ***G03B 30/00*** | (2021.01) |

(52) U.S. Cl.

CPC ....... *G02B 13/009* (2013.01); *G02B 13/0045* (2013.01); *G02B 13/06* (2013.01); *G03B 17/04* (2013.01); *G03B 30/00* (2021.01)

(58) Field of Classification Search

CPC .... G02B 13/0025–0045; G02B 13/009; G02B 13/06; G03B 17/04–045; G03B 30/00

See application file for complete search history.

(56) References Cited

U.S. PATENT DOCUMENTS

| | | | | |
|---|---|---|---|---|
| 5,689,376 A * | 11/1997 | Lewis | G02B 13/18 | 359/717 |
| 6,097,545 A * | 8/2000 | Vaughan | G02B 13/18 | 359/708 |
| 6,335,835 B1 * | 1/2002 | Koike | G02B 13/18 | 359/717 |
| 9,104,018 B2 * | 8/2015 | Ishihara | G02B 3/00 | |
| 2014/0015997 A1 * | 1/2014 | Baba | H04N 25/615 | 348/222.1 |

(Continued)

FOREIGN PATENT DOCUMENTS

| | | |
|---|---|---|
| CN | 110361852 A | 10/2019 |
| JP | 2021043385 A | 3/2021 |

OTHER PUBLICATIONS

Blahnik et al., "Smartphone imaging technology and its Applications", Article of Adv. Opt. Techn. 2021; 10(3): 145-232 in De Gruyter, Published on Aug. 10, 2021, (https://www.degruyter.com/document/doi/10.1515/aot-2021-0023/pdf), Carl-Zeiss-Straße 22, 73447 Oberkochen, Germany, in English.

(Continued)

*Primary Examiner* — Nicholas R. Pasko

(74) *Attorney, Agent, or Firm* — Ewers IP Law PLLC; Falk Ewers

(57) ABSTRACT

An optical arrangement for a mobile device includes a lens and an image receiver, the installation length $L_0$ of the optical arrangement being no more than 10 millimeters. The image receiver has a curved detector surface. The lens is typically arranged to be displaceable along a center axis relative to the image receiver between a compressed state and an operating state.

16 Claims, 11 Drawing Sheets

(56) References Cited

U.S. PATENT DOCUMENTS

| | | | | |
|---|---|---|---|---|
| 2014/0209786 | A1* | 7/2014 | Sano | H10F 39/806 359/714 |
| 2014/0253677 | A1* | 9/2014 | Chen | H04N 23/54 348/36 |
| 2015/0207990 | A1* | 7/2015 | Ford | G03B 37/00 348/262 |
| 2015/0358516 | A1* | 12/2015 | Baba | G02B 13/002 348/360 |
| 2015/0370037 | A1* | 12/2015 | Ishihara | G02B 9/60 348/294 |
| 2017/0230552 | A1 | 8/2017 | Eromäki et al. | |
| 2017/0293116 | A1* | 10/2017 | Matsumoto | G02B 13/02 |
| 2018/0045921 | A1* | 2/2018 | Kumazawa | G02B 13/0045 |
| 2018/0052385 | A1* | 2/2018 | Juhola | G02B 7/025 |
| 2018/0115688 | A1* | 4/2018 | Lin | G02B 7/34 |
| 2018/0316847 | A1* | 11/2018 | Lau | H04N 23/57 |

OTHER PUBLICATIONS

Office Action issued in German Patent Application No. DE 10 2022 124 982.4, dated May 10, 2023 (from which this application claims priority) and English language translation thereof.

* cited by examiner

OPTICAL ARRANGEMENT FOR A MOBILE DEVICE WITH A CURVED DETECTOR SURFACE

CROSS REFERENCE TO RELATED APPLICATIONS

This application claims priority to German patent application DE 10 2022 124 982.4, filed Sep. 28, 2022, the entire content of which is incorporated herein by reference.

TECHNICAL FIELD

The present disclosure relates to an optical arrangement with a lens and an image receiver, and to a mobile device.

BACKGROUND

Mobile devices have cameras in many applications, especially cellular telephones, tablets, netbooks or notebooks. Virtually every modern cellular telephone has one or more integrated cameras, each with an imaging optical system. The optical system is also referred to hereinafter as "mobile optics". The aforementioned cameras are attached virtually exclusively to the front and back side of the mobile device, with the optical axis of the associated optics being aligned perpendicular to the front and back side. As a consequence, the installation length of the optical system is specified by the thickness of the mobile device. In this context, 6 mm to 8.5 mm are typical values.

The quality of the optics has continuously improved in recent years, with the result that very high-quality images can be obtained these days using the mobile optics. In this case, one trend is toward ever larger detectors. In this context, the size of the detector is specified by a statistic in inches, but this does not correspond to the actual linear dimension of the detector. Enabling the use of what is known as a 1" sensor is considered a great challenge in this context. The latter has a half image field diagonal of approximately 8 mm. In this case, the great difficulty is due to the very restricted installation length of the optics, which is typically between 6 mm and 8.5 mm and specified by the thickness of the mobile device, for example a smartphone. Thus, realizing powerful optics in a very small installation space is sought after.

Prior art in relation to mobile optics is described for example in documents CN 110361852 A and in Blahnik, Schindelbeck, Smartphone imaging technology and its Applications, Adv. Opt. Techn. 2021; 10(3): 145-232 (https://www.degruyter.com/document/doi/10.1515/aot-2021-0023/pdf).

SUMMARY

Against this background, it is an object of the present disclosure to provide an advantageous optical arrangement and an advantageous mobile device. The object is achieved by an optical arrangement for a mobile device and a mobile device as described herein.

The optical arrangement according to an aspect of the disclosure for a mobile device includes a lens and an image receiver. The optical arrangement may be in the form of a camera or camera arrangement of a mobile device. The installation length $L_0$ of the optical arrangement is no more than 10 millimeters, typically no more than 8.5 millimeters. The installation length $L_0$ denotes the minimum overall length of the optical arrangement, from a first lens element vertex of the lens to the image receiver. The lens typically includes a plurality of lens elements. The first lens element vertex is understood to mean the lens element vertex of the first lens, counted from an object side. The lens element or the lens elements typically include optically transparent material. According to an aspect of the disclosure, the image receiver has a curved detector surface. In other words, the image receiver thus has a curved configuration.

The configuration according to an aspect of the disclosure makes image field flattening significantly easier. The background to this is explained hereinafter. Let y' be the half image field diagonal ("image height") and NA be the image-side numerical aperture of the imaging, then the &endue E of the system is calculated as follows: E=NA·y'

Thus, the ratio A of the &endue E to the minimal installation length $L_0$ of the optics possible from a mechanical point of view is a characteristic statistic for the design, specifically $$A = \frac{E}{L_0} = \frac{NA \cdot y'}{L_0}$$

In this case, the installation length should be the overall length in a retracted or compressed state (see below). Presently, the latter is assumed to be 8.5 mm throughout. A paraxial, one lens element model for the optics is initially assumed to emphasize the size of the challenge; see also FIG. 1 in this respect. In this case, the stop is in the vicinity of the (only) lens element (in the model), at the greatest possible distance from the image plane. The half field angle of the object space w is given by $$\tan(\omega) = \frac{y'}{L}$$

There is a very large half field angle of 45 degrees (ω≈45°) in the case of a half image field diagonal y'≈L which approximately corresponds to the installation length. The value for ω increases accordingly if the stop should even be attached between the first lens element and the image receiver. Using a stop upstream of the first lens element is not to be expected as a result of the restriction of the installation space to 8.5 mm. Accordingly, the optics configuration must be adapted, while keeping the mechanical boundary conditions in mind, in such a way that the object-side half field angle is reduced. Flattening the image field is a very significant challenge in the case of this extreme field angle. Likewise, correcting the image field flattening must thus be simplified. Moreover, an angle of incidence of the chief ray at the image field edge which will significantly exceed the conventional 30 to 35 degrees (vis-à-vis the normal on the detector surface) must be expected at the detector surface—this angle tends to be 45 degrees in the paraxial consideration pursued above. Such large angles of incidence make coupling the radiation into the image receiver more difficult.

The curved configuration of the detector surface facilitates the image field flattening by virtue of the chief ray angle at the detector being reduced. This facilitates the input coupling of the light into the image receiver. In the case of the detector surface with the curved configuration according to an aspect of the disclosure, the image field diagonal can be measured radially from an optical axis of the image receiver.

The image receiver can have a spherically or conically or aspherically or cylindrically curved detector surface. In a typical variant, the image receiver has a concavely curved detector surface, in particular a detector surface that is concavely curved vis-à-vis the incident light direction, for example a spherically or conically or aspherically or cylindrically curved detector surface. An asphere is understood as meaning a rotationally symmetric area, the surface of which may have regions with differing radii of curvature. A cylindrical curvature is advantageous in the case of a rectangular image receiver with a large aspect ratio.

The curved detector surface may have a radius of curvature $R_D$, for which the following holds true: the absolute value of the quotient of radius of curvature $R_D$ and installation length $L_0$ is less than 5, for example is less than 3, typically is less than 2.5. Thus, the following holds true for a corresponding variable G:

$$G = \left|\frac{R_D}{L_0}\right| < 5$$

For example, in the case of an installation length of less than 10 millimeters, the curved detector surface may be more curved than a surface with a radius of curvature of −20 millimeters. In particular, the detector surface may have a radius of curvature of −16 millimeters. Radii of curvature of a surface whose centers are closer to the object than the surface are usually represented by negative numbers. This corresponds to a concave surface in the case of an air/glass interface or, presently, an air/detector interface. The angle of incidence of the chief ray at the image receiver may be no more than 30 degrees, typically no more than 20 degrees.

In a particularly advantageous variant, the entire lens or at least a part of the lens is arranged to be displaceable or shiftable, that is to say movable by translation, along a center axis, relative to the image receiver between a retracted or compressed state and an extended state or operating state. In particular, only at least one part of the lens, for example at least one lens element of the lens, may be displaceably arranged, while at least one other part of the lens is arranged in stationary, that is to say non-displaceable, fashion. For example, a field lens may be present, which is arranged stationarily in the vicinity of, or directly in front of, the image receiver. Individual parts of the lens may be arranged to be displaceable to different extents. Individual parts of the lens may be displaceably arranged vis-à-vis one another, for example within the scope of realizing zoom optics. In particular, the center axis can be an axis which runs parallel to a surface normal of the detector surface of the image receiver at the vertex thereof. The center axis may also run along an optical axis of the optical arrangement. In an advantageous variant, the installation length L0 of the optical arrangement is no more than 10 millimeters, typically no more than 8.5 millimeters, in the compressed state and/or the installation length L1 of the optical arrangement is at least 12 millimeters, typically at least 13 millimeters, in the operating state.

The displaceability is advantageous in that this can reduce the object-side half field angle. Moreover, this configuration contributes to reducing the chief ray angle at the image receiver, specifically at the detector surface, which facilitates the input coupling of the light into the detector. For example, the installation length of the lens from the first to the last lens element vertex may correspond to the thickness of a mobile device, for example a smartphone. However, the entire optics may be displaceable or shiftable along the optical axis, in the sense of a telescopic arrangement. In particular, the lens can be extended away from the image receiver out of the housing of the smartphone during the recording process, in order to thus obtain a greater distance of the front lens element from the imager, in particular the detector surface.

By moving the entire lens away from the image receiver, it is moreover possible to configure the lens elements with a significantly smaller diameter than the diameter of the detector surface. In contrast with conventional mobile optics, the lens element diameters are only driven decisively by the clear aperture diameters of the lens elements of the system and only driven to a subordinate extent by the size of the image receiver, specifically the detector surface. On the one hand, this saves material but on the other hand also enables a greater packing density, that is to say more lens elements per mm system length. Only this makes it possible to accommodate a relatively large number (e.g., 6 or 7) of lens elements in the lens. A further advantage in comparison with previous solutions consists of there being significantly more freedom with regards to the position of the stop. This will be explained in the context of the exemplary embodiments.

In a further variant, the optical arrangement may have an image-side numerical aperture NA and, in the compressed state, an installation length $L_0$. The image receiver can have a half diameter y', with the following holding true: the quotient of the product of the numerical aperture NA and the half diameter of the image receiver y' and the installation length in the compressed state $L_0$ is greater than 0.2. Thus, the following holds true for a corresponding variable A:

$$A = \frac{NA \cdot y'}{L_0} > 0.2$$

The object-side half field angle is typically less than 40 degrees. For example, it can be 35 degrees.

Further, the installation length of the optical arrangement can be $L_1$ in the operating state. This is larger than the installation length of the optical arrangement in the compressed state $L_0$ ($L_1 > L_0$). The following advantageously holds true: the quotient of the installation length in the operating state $L_1$ and the installation length of the optical arrangement in the compressed state $L_0$ is larger than 1.2, typically larger than 1.5. Thus, the following holds true for a corresponding variable B:

$$B = \frac{L_1}{L_0} > 1.2$$

The image receiver may have a half diameter y' and the lens may have a maximum clear optical diameter of all lens element surfaces $D_L$, with the following holding true: the quotient of the maximum clear optical diameter of all lens element surfaces $D_L$ and the half diameter of the image receiver y' is less than 1.5, for example less than 1.2, typically less than 1.0. Thus, the following holds true for a corresponding variable C:

$$C = \frac{D_L}{y'} < 1.5$$

In a further variant, the lens may have an optically effective surface with a minimum clear optical half diameter $h_m$, a first optically effective surface, that is to say for example first in the beam direction or in the light incidence direction or on the object side or geometrically, with a clear optical half diameter $h_1$ in the beam path, and a last optically effective surface with a clear optical half diameter $h_L$ in the beam path, with the following holding true: the quotient of the sum of the clear optical half diameter $h_1$ of the first optically effective surface and the clear optical half diameter $h_L$ of the last optically effective surface and twice the minimum clear optical half diameter hm is greater than 1.25, in particular larger than 1.3, or typically larger than 1.5. Thus, the following holds true for a corresponding variable F:

$$F = \frac{(h_1 + h_L)}{2h_m} > 1.25$$

The optical arrangement can have a focal length f, with the following holding true: the quotient of the focal length f and the installation length $L_0$, wherein this may relate to the installation length in the compressed state in particular, is larger than 1, for example larger than 1.2, typically larger than 1.5.

$$\frac{f}{L_0} > 1$$

Thus, this realizes an optical arrangement with a long focal length in a short installation space.

The lens may include a plurality of lens elements successively arranged in the beam path, especially along an optical axis, with lens elements made of crown material (e.g., polymethylmethacrylate (PMMA)) and lens elements made of flint material (e.g., polystyrene) typically being present. Typically, lens elements made of crown material and lens elements made of flint material are successively arranged in alternating fashion.

The mobile device according to an aspect of the disclosure includes an above-described optical arrangement according to an aspect of the disclosure. The mobile device according to an aspect of the disclosure can be a cellular telephone or a smartphone, a tablet, a notebook, a smartwatch, a netbook, a monitor, etc. Said mobile device has the above-described advantages of the optical arrangement according to an aspect of the disclosure.

The disclosure is explained in greater detail below on the basis of exemplary embodiments with reference to the accompanying figures. Although the disclosure is more specifically illustrated and described in detail by means of the typical exemplary embodiments, the disclosure is not restricted by the examples disclosed and other variations can be derived therefrom by a person skilled in the art, without departing from the scope of protection of the disclosure.

The figures are not necessarily accurate in every detail and to scale, and can be presented in enlarged or reduced form for the purpose of better clarity. For this reason, functional details disclosed here should not be understood as restrictive, but merely to be an illustrative basis that gives guidance to a person skilled in this technical field for using the present disclosure in various ways.

The expression "and/or" used here, when it is used in a series of two or more elements, means that any of the elements listed can be used alone, or any combination of two or more of the elements listed can be used. If for example a composition containing the components A, B and/or C is described, the composition may contain A alone; B alone; C alone; A and B in combination; A and C in combination; B and C in combination; or A, B, and C in combination.

BRIEF DESCRIPTION OF THE DRAWINGS

The disclosure will now be described with reference to the drawings wherein.

DESCRIPTION OF EXEMPLARY EMBODIMENTS

Figure 1:
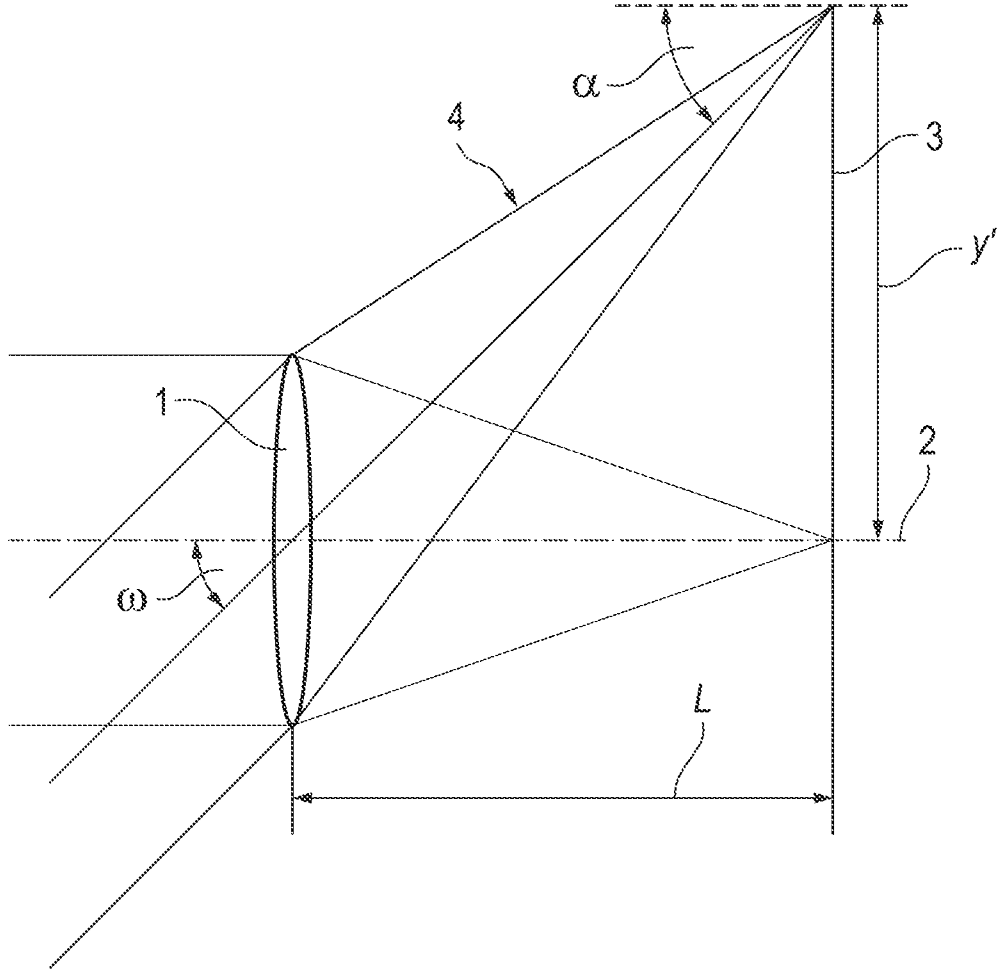
FIG. 1 schematically shows the beam path through a lens element.

Initially, the starting point for the present disclosure is illustrated hereinbelow on the basis of FIG. 1. FIG. 1 schematically shows the beam path through a lens element in a paraxial model for the optics. The lens element is identified by the reference sign 1. The optical axis is identified by the reference sign 2. The image plane is identified by the reference sign 3. The light rays or the beam path is identified by the reference sign 4. In this case, the stop is in the vicinity of the (only) lens element 1 (in the model), at the largest possible distance from the image plane 3. At this position, it also forms the exit pupil of the system at the same time.

The half field angle of the object space $\omega$ is given by $$\tan(\omega) = \frac{y'}{L}$$

There is a very large half field angle of 45 degrees ($\omega \approx 45°$) in the case of a half image field diagonal $y' \approx L$ which approximately corresponds to the installation length. Should the stop be attached between the first lens element and the image receiver, then the exit pupil is closer to the image plane and the value of ω increases accordingly. The optics configuration must be adapted, while keeping the mechanical boundary conditions in mind, in such a way that the object-side half field angle is reduced. Flattening the image field and its correction at large field angles represents a particular challenge. In the situation with y'≈L shown, it is expected that an angle of incidence a of the chief ray at the image field edge in the image plane 3 or at a detector surface of an image receiver arranged there will significantly exceed the usual 30 to 35 degrees vis-à-vis the normal to the detector surface or the image plane 3 and is approximately 45 degrees. Such large angles of incidence make coupling the radiation into the detector more difficult.

Figure 2:
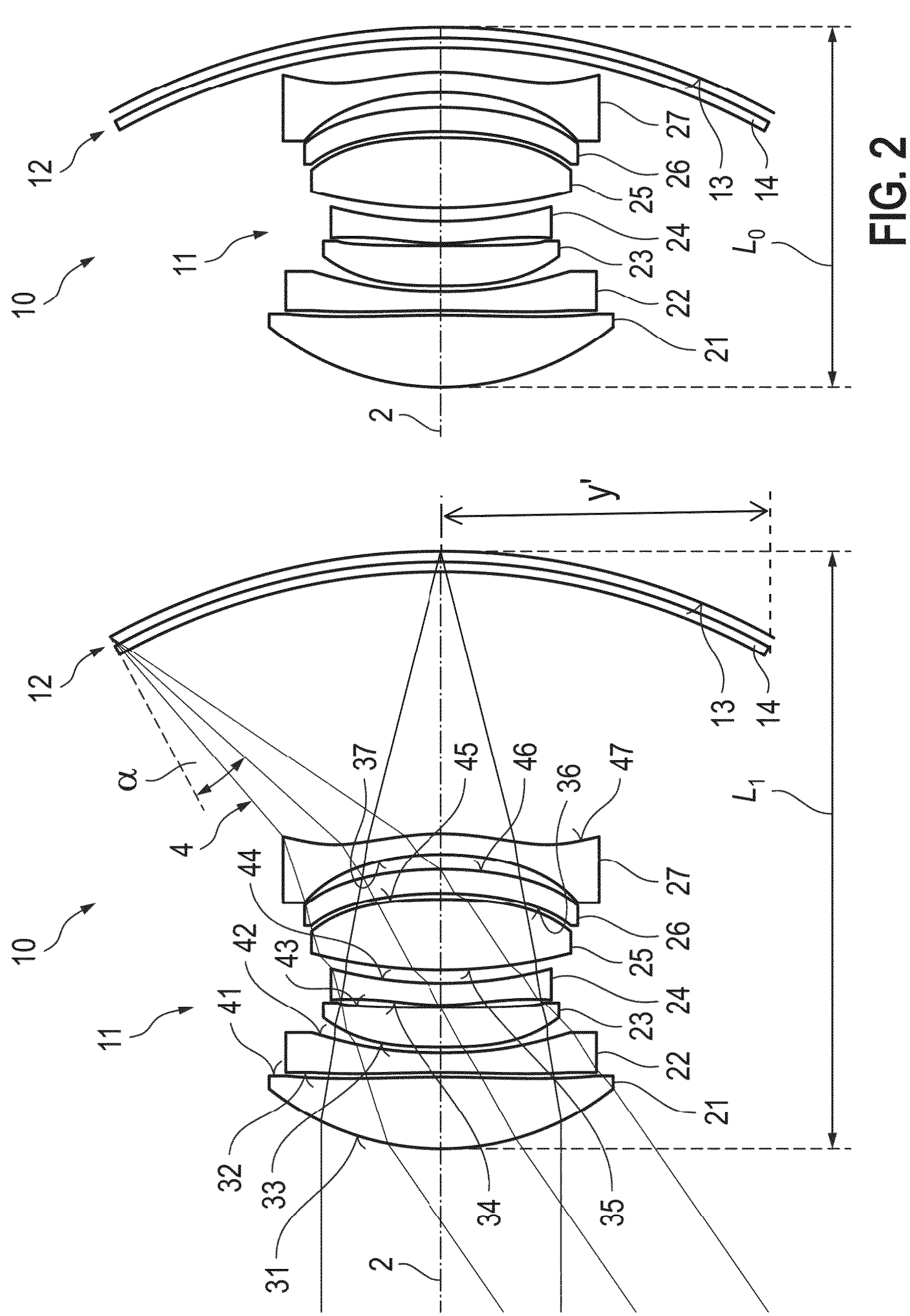
FIG. 2 schematically shows an optical arrangement according to a first exemplary embodiment of the disclosure.

FIG. 2 schematically shows an optical arrangement 10 according to a first exemplary embodiment of the disclosure. In FIG. 2, the optical arrangement 10 is shown in an operating state or in an extended or expanded state on the left-hand side. The right-hand side of FIG. 2 shows the optical arrangement 10 in a retracted or compressed state. The optical arrangement 10 includes a lens 11 and an image receiver 12. The lens 11 is arranged to be displaceable or shiftable, that is to say movable by translation, along a center axis 2 which simultaneously forms the optical axis in the example shown, relative to the image receiver 12.

The image receiver 12 includes a concavely curved detector surface 13 and a coverslip 14 arranged in front of the detector surface 13 on the object side. The coverslip 14 is likewise concavely curved. The coverslip serves to mechanically protect the sensor and possibly to filter the wavelength of the light. In particular, it is irrelevant to the imaging quality and could also be omitted in other exemplary embodiments. By way of example, the detector surface 13 can be spherically or conically or aspherically curved.

The lens 11 includes a plurality of lens elements successively arranged in the beam path 4 along the center axis 2. Specifically, the shown lens 11 includes seven lens elements, which are identified by the reference signs 21 to 27. The lens elements each have a front side arranged on the object side and a back side arranged on the image side, both of which sides have an aspherical embodiment. The front sides are identified by the reference signs 31 to 37, and the back sides are identified by the reference signs 41 to 47.

Two different transparent optical materials, specifically the plastics PMMA ("acrylic glass" or "polymethylmethacrylate") and polystyrene, are used for the lens elements both in the exemplary embodiment shown and in all subsequent exemplary embodiments. The material PMMA has a refractive index of 1.4906 and an Abbe number of 58.00. The material polystyrene has a refractive index of 1.5916 and an Abbe number of 29.53. The optical properties, especially the Abbe numbers, of the two materials in this case allow the correction of the decisive chromatic aberrations of the configuration, specifically the longitudinal chromatic aberration and the transverse chromatic aberration. In this case, the PMMA acts as a crown material and the polystyrene acts as a flint material. In the example shown, the lens elements 21, 23, 25, and 27 are made of PMMA and the lens elements 22, 24, 26 are made of polystyrene. Thus, PMMA lens elements and polystyrene lens elements alternate in their sequence. Other sequences and different materials are also possible.

In the extended state or in the operating state, the optical arrangement 10 has an installation length L1 of just above 14 mm. It can be compressed to an installation length L0 of 8.5 mm in the retracted or compressed state. The installation length is in each case measured from the first lens element vertex, that is to say the lens element vertex of the front side 31 of the first lens element 21 on the object side, to the vertex of the detector surface 13.

The system stop is located in the interior of the optics between the lens elements 23 and 24. All field pencil beams fill the entire stop, that is to say there is no vignetting. The object-side half field angle is approximately 35 degrees and is therefore significantly below the paraxial estimate in the case of a non-compressible lens, specified above, despite the interior stop.

The aperture of the system FNO is f/2.0 in the present case, corresponding to a numerical aperture NA of 2.5. Here, f is the focal length.

$$NA = \frac{1}{2 \cdot FNO} = 0.25$$

The field angle in the object space leads to a field height y' of 8 mm in the case of a focal length of approximately 11.5 mm. Here, "field height" is understood as meaning the radial distance of the outermost field point from the optical axis 2. With these variables, the compactness parameter A is derived as $$A = \frac{NA \cdot y'}{L_0} \approx 0.235$$

A further option for characterizing the compactness of the optical arrangement or the configuration includes providing the length ratio B between the installation lengths in a compressed or retracted state ($L_0$) and in an extended state or operating state ($L_1$). In this case, the parameter B should be defined as $$B = \frac{L_1}{L_0}$$

In the present exemplary embodiment, it is B=1.662 with $L_0$=8.5 mm and $L_1$=14.1 mm. According to an aspect of the disclosure, a large value of the parameter B is sought after.

The compactness can also be characterized by a further parameter C, specifically the ratio of the maximum lens element diameter to the diameter of the detector surface 13, with the diameter being measured in the radial direction. By moving the entire lens 11 away from the image receiver 12, it is possible in this case to be able to configure the lens elements with a significantly smaller diameter than the diameter of the detector surface 13. According to the solutions in the prior art (e.g., see CN 110361852 A), lens elements with a significantly smaller diameter than the diameter of the detector surface have not been possible to date. In contrast with conventional mobile optics, the lens element diameters are only driven decisively by the aperture (FNO) of the system and only driven to a subordinate extent by the size of the image receiver 12, specifically the detector surface 13. On the one hand, this saves material but on the other hand also enables a greater packing density, that is to say more lens elements per mm system length. Only this makes it possible to accommodate a relatively large number (e.g., 6 or 7) of lens elements in the lens. The parameter C can be defined as follows:

$$C = \frac{D_M}{y'}$$

In this case, $D_M$ denotes the maximally occurring (clear optical) diameter of all lens element surfaces and y' denotes the half image field diagonal, as above. For this first exemplary embodiment, the value is $D_M$=8.15 mm on the first optical surface 31. With a half detector diagonal of y'=8 mm, this yields C≈1.02.

A further peculiarity of the present optics, in comparison with the mobile optics from the prior art, is that the stop is clearly within the interior of the optics. This is not the case in "conventional" mobile optics; there, the system stop generally comes to rest in the vicinity of the first system surface. Now, phenomenologically the position of the stop often represents a constriction in the beam path; what is known as a "waist" arises in the lens section as a result. Lens elements with a small clear optical diameter are surrounded by those with a larger clear optical diameter. This circumstance can also be described by a further parameter F. Let $D_1$ be the (clear optical) diameter of the first optically effective surface and $D_L$ be the (clear optical) diameter of the last optically effective surface of the displaceable part of the optics, that is to say of the lens 11, without a possible coverslip in front of the detector surface 13, and let D be a minimum clear optical diameter of a surface within the lens 11, then the parameter F can suitably be defined by way of $$F = \frac{(D_1 + D_L)}{2D_m}$$

In the present case, $D_1$=4.07, $D_L$=3.80 and $D_M$=2.41 on the front side 34 of the fourth lens element 24. Hence, F=1.633.

The image receiver 12, specifically the detector surface 13, is spherically curved and consequently deviates significantly from a planar form. The image receiver or the detector surface has a concave radius of curvature of −16.56 mm. As a result, the image receiver or the detector surface has a sag of approximately 2 mm at the edge. From the lens section, it is evident that the detector surface curvature leads to a reduction in the angle of incidence of the chief ray a at the detector surface 13. It is only approximately 20 degrees at the field edge, with the result that simple input coupling into the image receiver 12 is ensured.

The curvature of the detector surface 13 can be characterized by the parameter G. Let $R_D$ be the radius of curvature of the detector surface and let $L_0$ be the inserted overall length of the mobile optics, then the following holds true $$G = \left|\frac{R_D}{L_0}\right|$$

The value of G specifies how strongly the detector surface is curved, that is to say how much use is made of the advantage of a curved detector surface within the meaning of the disclosure. In the present example, G is 1.948.

$$G = \left|\frac{-16.56}{8.5}\right| = 1.948$$

Figure 3:
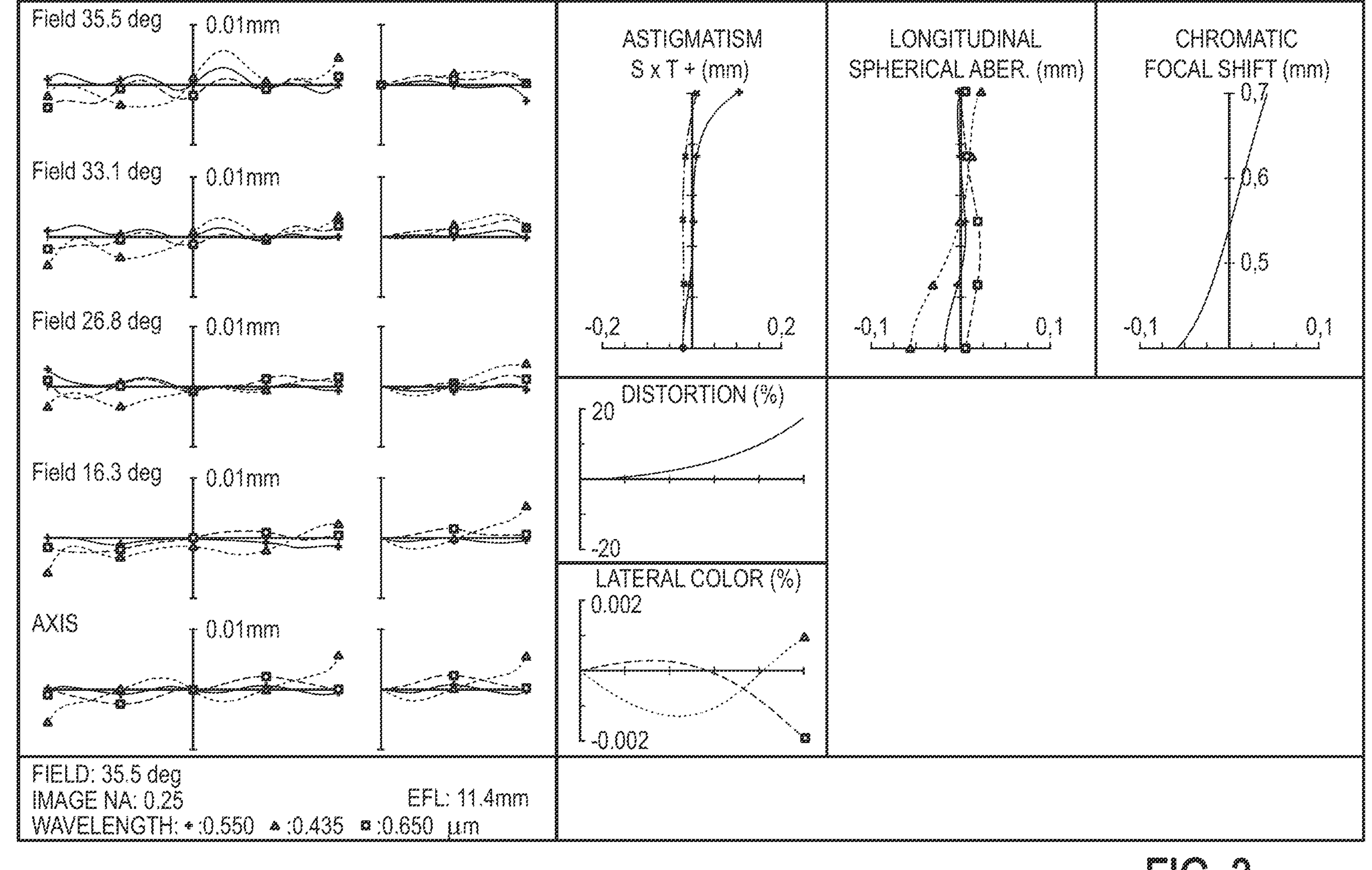
FIG. 3 schematically shows aberrations of the exemplary embodiment shown in FIG. 2.

FIG. 3 illustrates the substantial aberrations of the exemplary embodiment shown in FIG. 2. The transverse aberrations for three different wavelengths and for different field angles are shown on the left. The astigmatism is shown top center, the longitudinal spherical aberration is shown to the right thereof and, to the right thereof, it is the chromatic focal shift that is shown. Shown under the astigmatism is the distortion and, below the latter, the lateral chromatic aberration. The good polychromatic correction is identified. It is identified from the display of the longitudinal spherical aberration in particular that the chromatic longitudinal aberration successfully compensates the Gaussian aberration ("spherochromatism").

Figure 4:
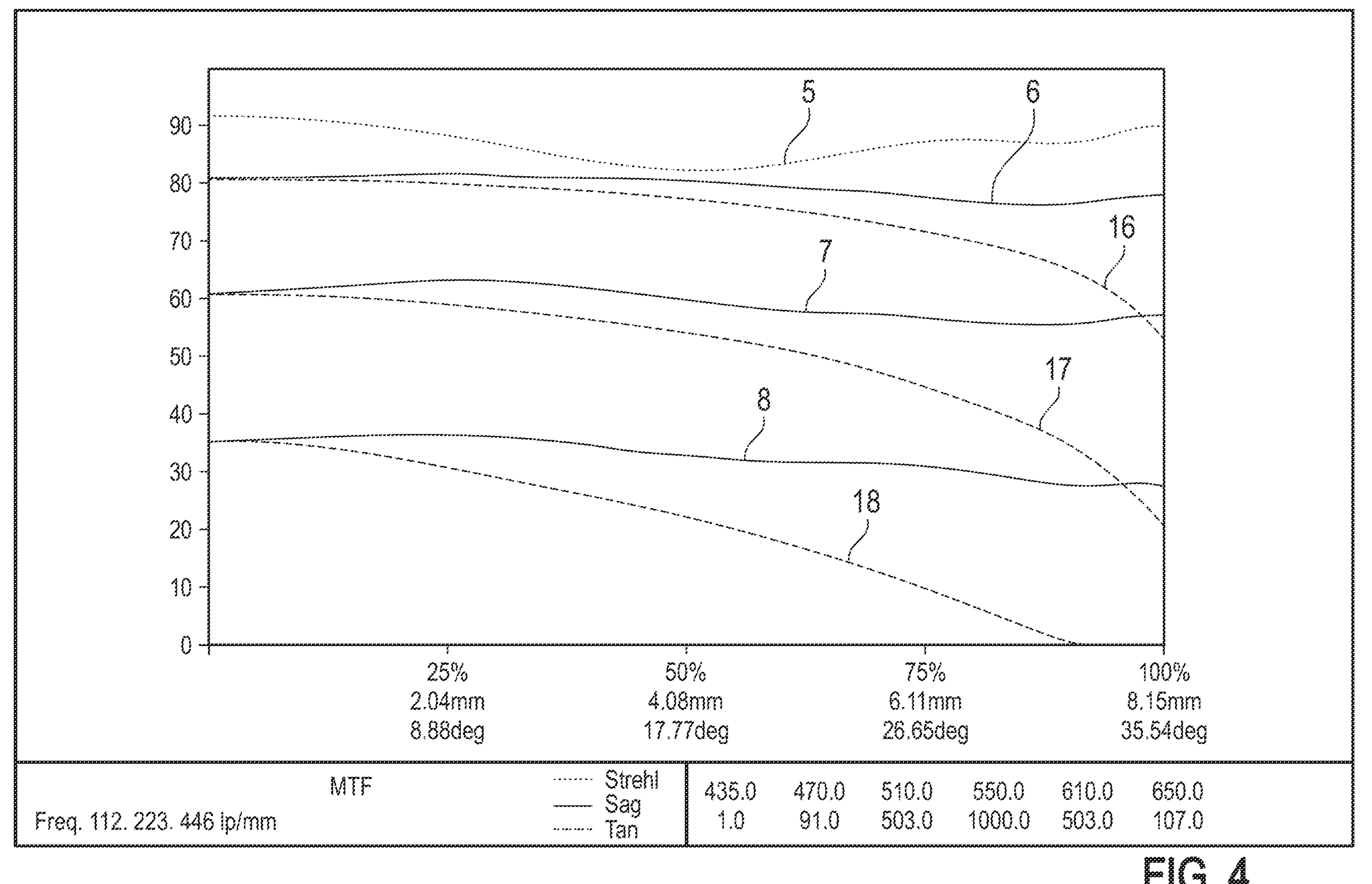
FIG. 4 schematically shows the polychromatic modulation transfer function (MTF) of the exemplary embodiment shown in FIG. 2, for three selected spatial frequencies, and the polychromatic Strehl ratio as a function of the field angle.

Moreover, FIG. 4 shows the polychromatic modulation transfer function (MTF) of the optics for three selected spatial frequencies (112, 223 and 445 lp/mm, that is to say "line pairs per millimeter"), and, using dots, the polychromatic Strehl ratio as a function of the field angle. In this case, the x-axis specifies the field height in percent, the corresponding image height in millimeters, and the corresponding object field angle in degrees. The y-axis plots the contrast in percent. The Strehl ratio is identified as a curve with the reference sign 5. The curve 6 describes the contrast of sagittal structures with an image frequency of 112 lp/mm and the curve 16 describes the contrast of tangential structures with an image frequency of 112 lp/mm. The curve 7 describes the contrast of sagittal structures with an image frequency of 223 lp/mm and the curve 17 describes the contrast of tangential structures with an image frequency of 223 lp/mm. The curve 8 describes the contrast of sagittal structures with an image frequency of 446 lp/mm and the curve 18 describes the contrast of tangential structures with an image frequency of 446 lp/mm. From FIG. 4, it is evident that the correction by the optical arrangement is above the diffraction limit (Strehl>80%), and hence can be considered to be sufficient.

The parameters provided in this description and the derived variables, which describe the compactness of the configurations, are compiled in table 1 for this and the subsequent exemplary embodiments.

Figure 5:
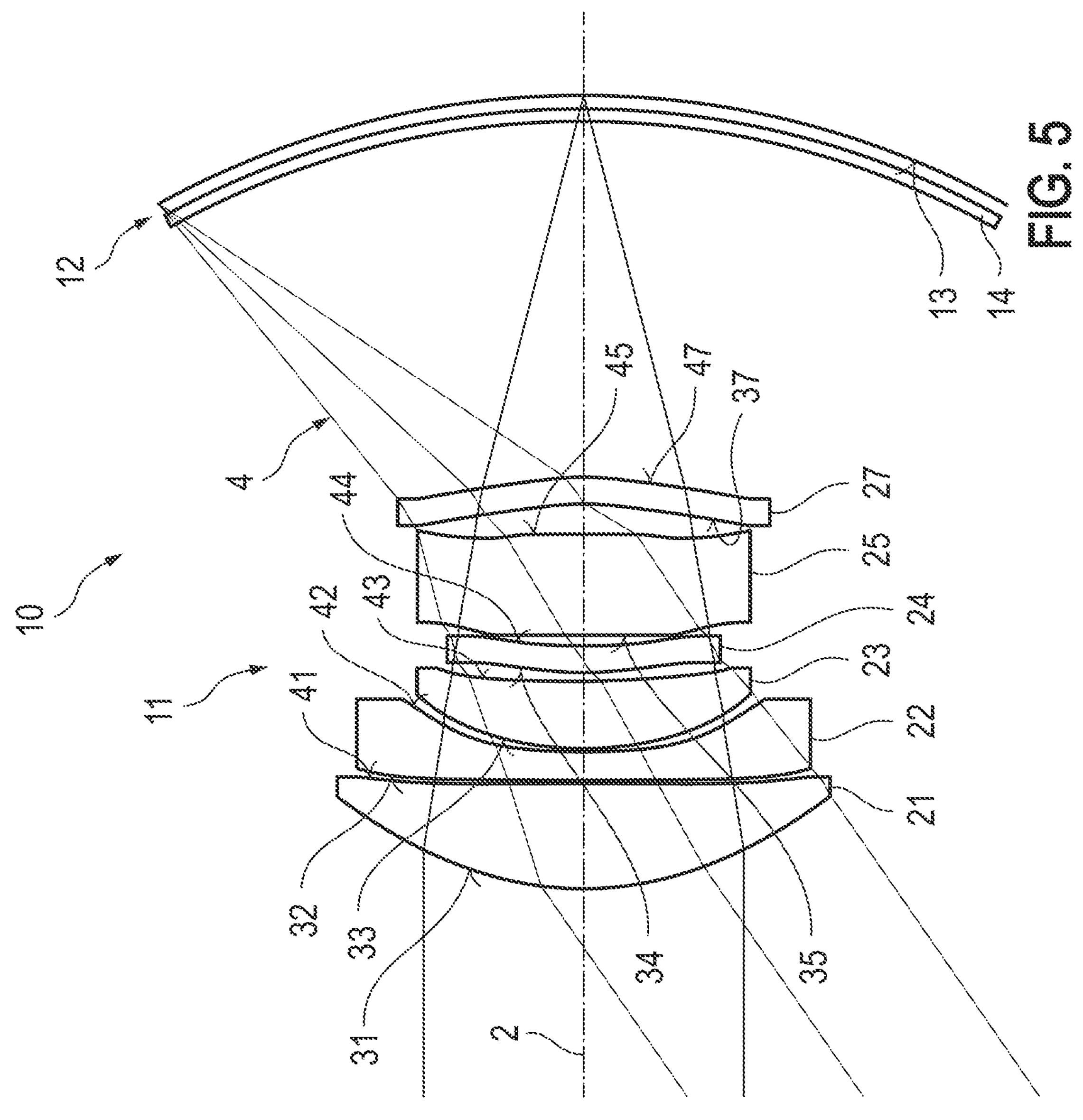
FIG. 5 schematically shows an optical arrangement according to a second exemplary embodiment variant of the disclosure.

FIG. 5 schematically shows an optical arrangement 10 according to a second exemplary embodiment of the disclosure. The same characteristics as in the first exemplary embodiment (FIG. 2) are implemented in this exemplary embodiment; the only difference is that the penultimate lens element 26 was dispensed with, in order to make the configuration simpler as a matter of principle. As a result, the compactness parameter remains at A≈0.235. The lens 11 now includes six rather than seven lens elements 21 to 25 and 27. The aperture stop is located in the air space between the third lens element 23 and forth lens element 24. Yet again, a curved coverslip 14 has been applied in front of the sensor surface 13 for the protection of the latter. There is also the option of applying an optical layer, which at least partially, typically completely, blocks ultraviolet and/or infrared radiation, to this coverslip 14.

Figure 6:
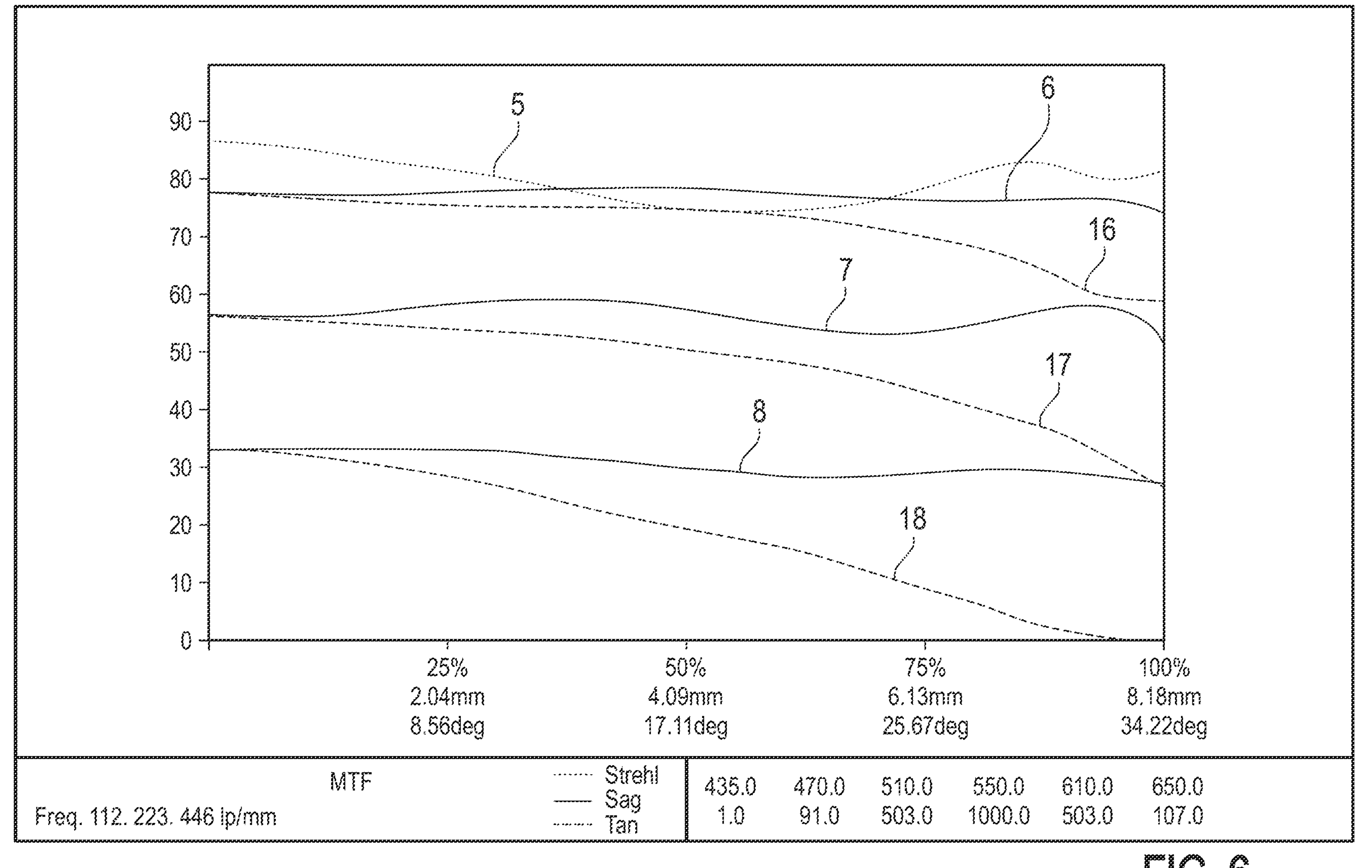
FIG. 6 schematically shows the polychromatic modulation transfer function (MTF) of the exemplary embodiment shown in FIG. 5.

The displacement path or translation path of the lens is approximately 6.5 mm in this exemplary embodiment; the compressed state has not been depicted separately. For the exemplary embodiment shown in FIG. 5, FIG. 6 shows the polychromatic modulation transfer function (MTF) of the optics for three selected spatial frequencies and, using dots, the polychromatic Strehl ratio as a function of the field angle. The correction state is no longer as good as in the first exemplary embodiment (Strehl>75%), but possibly nevertheless still sufficient in view of an economical decision in respect of the lower manufacturing costs as a result of fewer lens elements.

Figure 7:
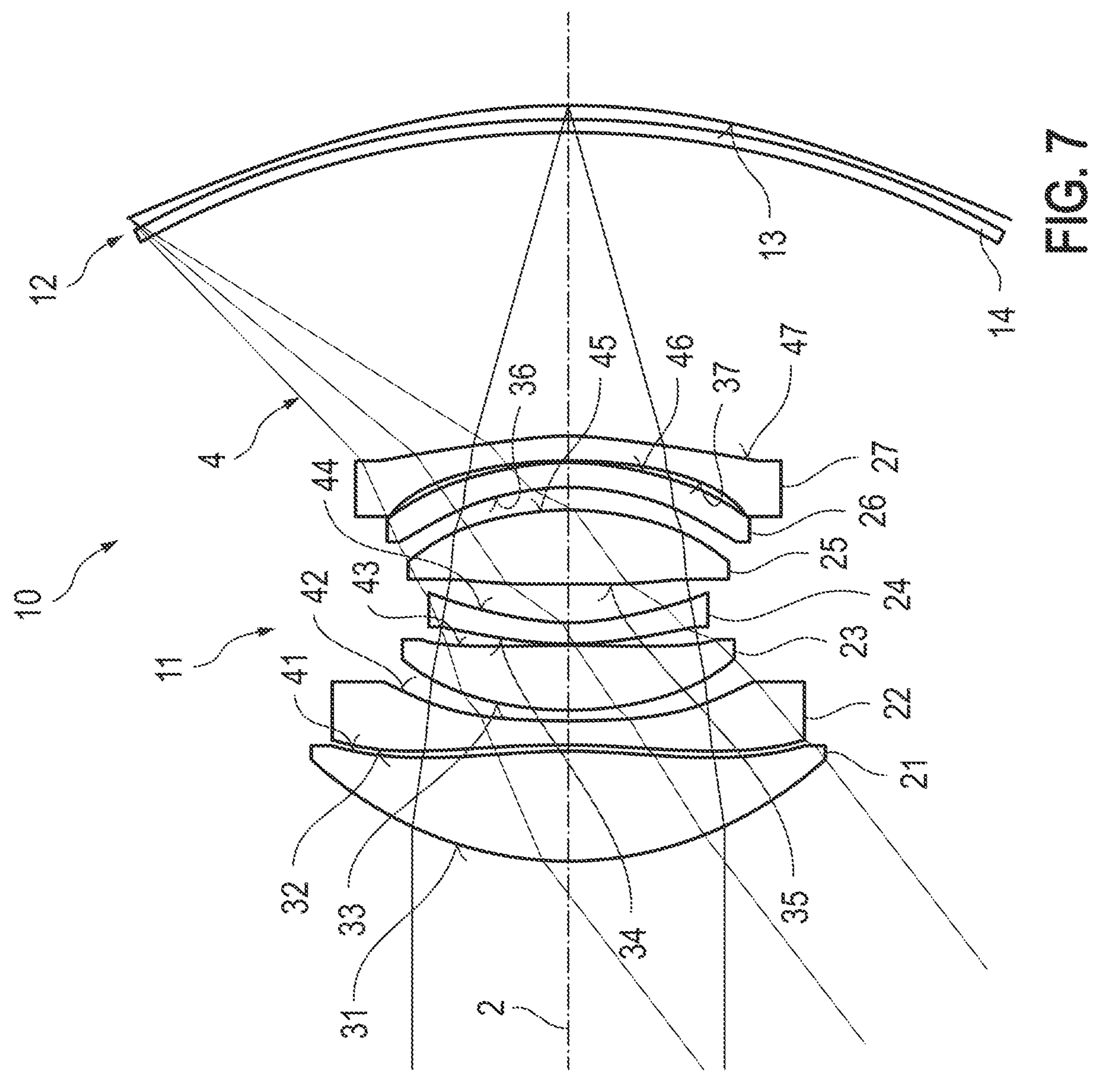
FIG. 7 schematically shows an optical arrangement according to a third exemplary embodiment of the disclosure.
Figure 8:
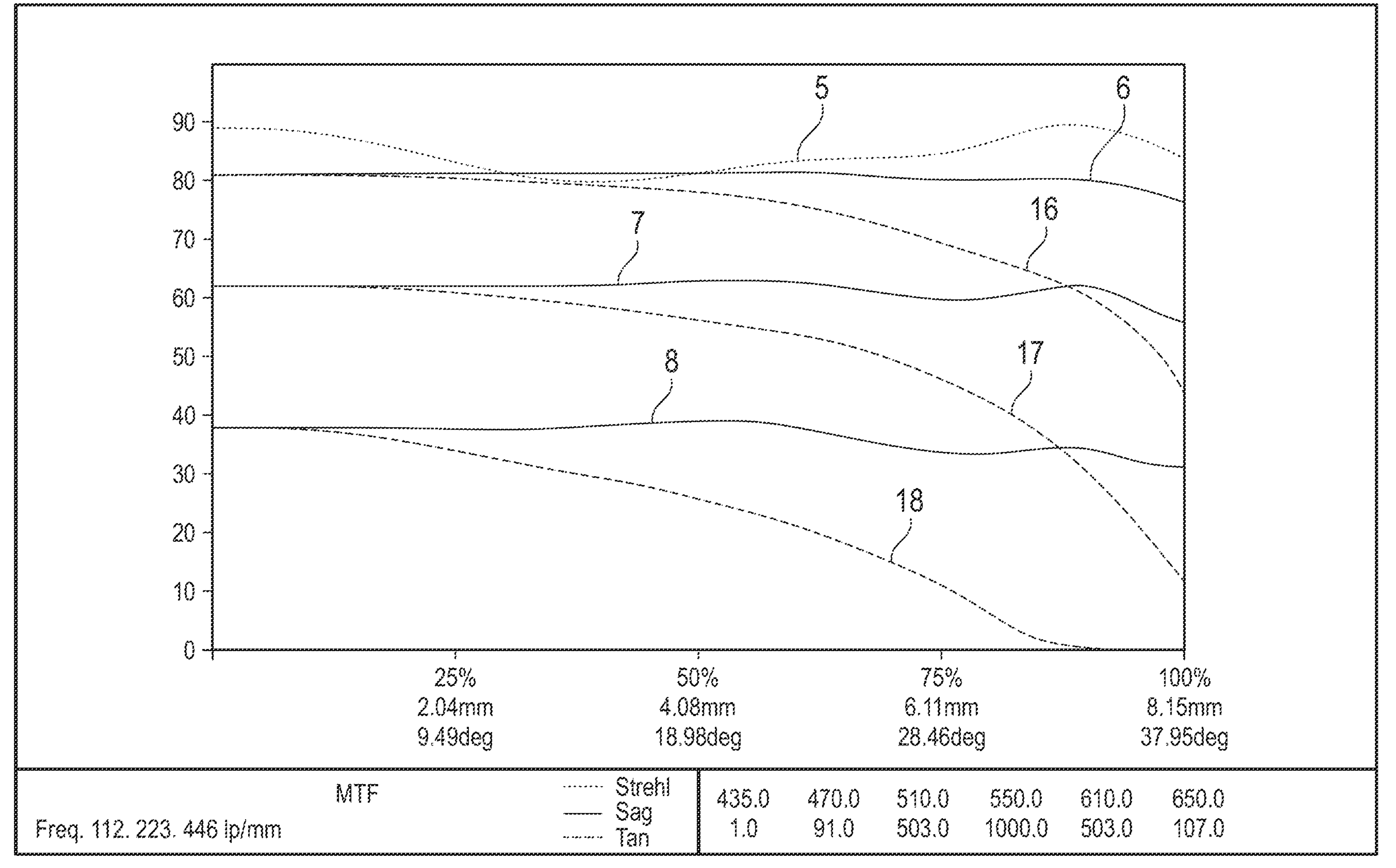
FIG. 8 schematically shows the polychromatic modulation transfer function (MTF) of the exemplary embodiment shown in FIG. 7.

FIG. 7 schematically shows an optical arrangement 10 according to a third exemplary embodiment of the disclosure. In the third exemplary embodiment, the curved detector surface 13 was additionally configured aspherically rather than having the pure spherical curvature of the preceding examples. This further degree of freedom further simplifies the correction of the field curvature, especially the field curvature of higher order. This simplification leads to the aperture in this exemplary embodiment being able to be increased from f/2.0 to f/1.8, and hence to the compactness parameter increasing to A≈0.261. The value for the polychromatic Strehl ratio could be maintained above 80%, as shown in FIG. 8. The profiles of the MTF curves are very comparable to those of the first exemplary embodiment, but have slightly higher contrast on account of the improved f-number of f/1.8. The asphericity of the detector surface 13 is evident from the comparison of the shape with the spherical coverslip 14 arranged immediately therebefore. In respect of the arrangement of the lens elements and the material sequence, this third exemplary embodiment substantially corresponds to the first exemplary embodiment.

Figure 9:
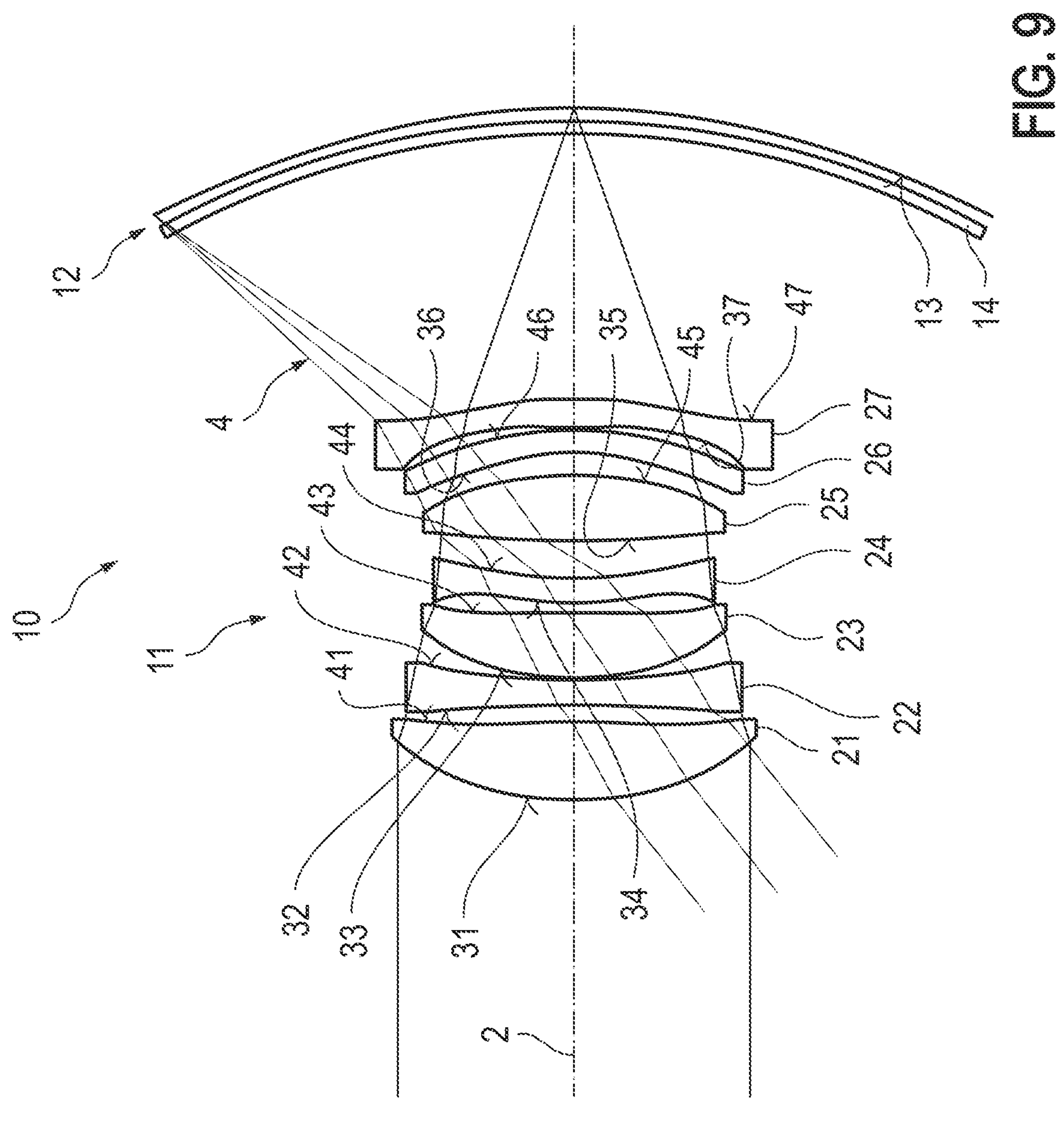
FIG. 9 schematically shows an optical arrangement according to a fourth exemplary embodiment of the disclosure.

FIG. 9 schematically shows an optical arrangement 10 according to a fourth exemplary embodiment of the disclosure. In contrast with the preceding exemplary embodiments, significant vignetting was allowed in the fourth exemplary embodiment, with the outermost field point now only still filling approximately 50 percent of the entrance pupil in the meridional direction. This is evident from the field pencil beams from the field edge no longer striking the edge of the aperture stop but being decisively curtailed at the first lens element surface 31 and the last lens element surfaces, that is to say the front sides 35 to 37 and the back sides 45 to 47 of the lens elements 25 to 27. The vignetting allowed the aperture of the overall system to be increased to f/1.5. However, this also again led to an increase in the compactness parameter and the latter now is A≈0.314.

The position of the aperture stop is of subordinate importance as a result of the field pencil beams being curtailed on other surfaces to the aperture stop. In particular, it would be conceivable to now embody the aperture stop as a front stop. In order to achieve a defined curtailment of the field pencil beams, it is advantageous to position a respective stop in front of the first lens element 21 and the last lens element 27. For mechanical reasons, the back stop may also be arranged in front of the penultimate lens element 26, depending on the spatial conditions.

Figure 10:
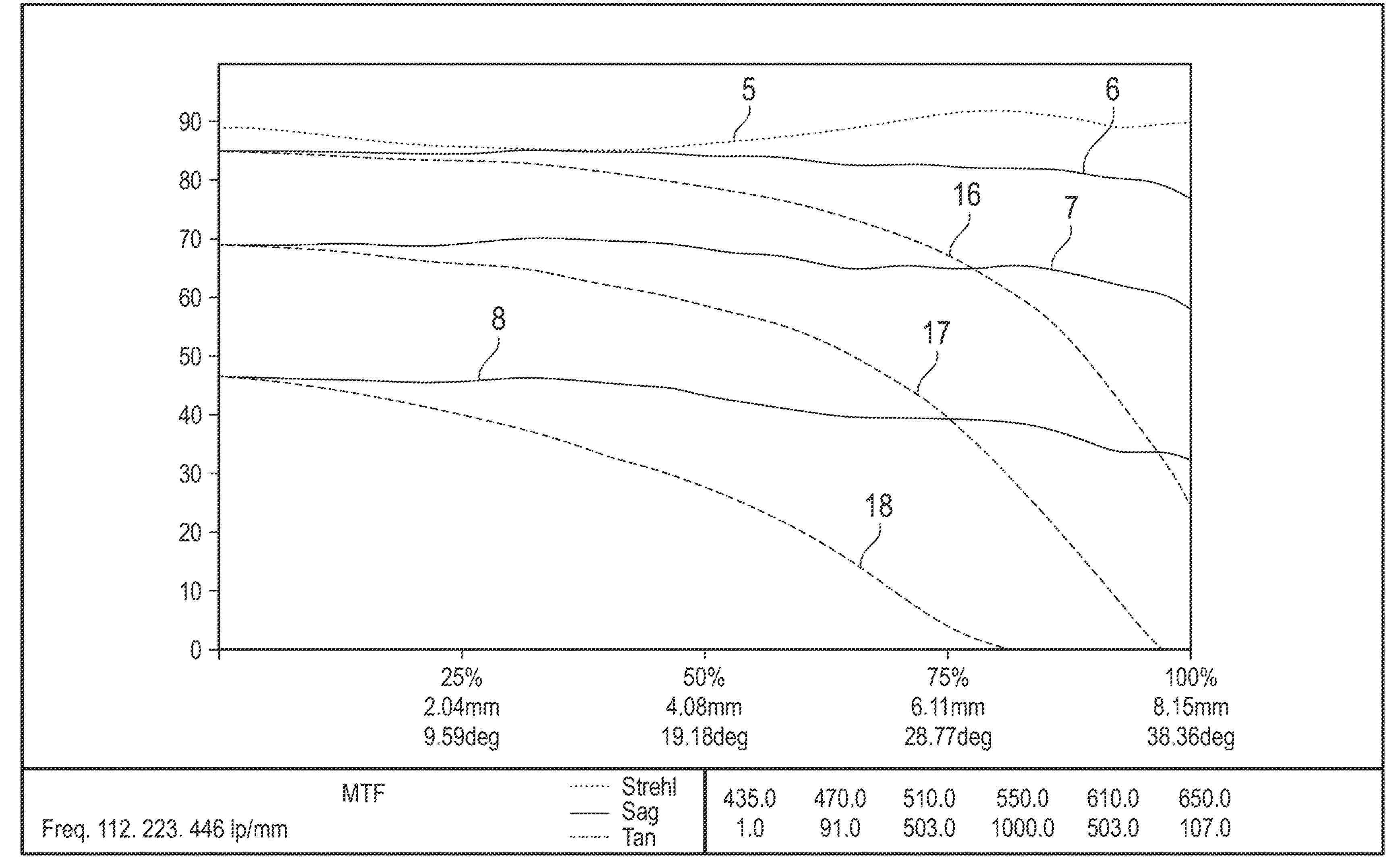
FIG. 10 schematically shows the polychromatic modulation transfer function (MTF) of the exemplary embodiment shown in FIG. 9.

The imaging performance of the lens 11 of the exemplary embodiment shown in FIG. 9 is depicted in FIG. 10 in the form of a modulation transfer function (MTF). The gain in contrast for the field center as a result of the increased aperture is clearly evident. However, it is also clear that, as expected, the meridional contrast (dashed lines) collapses significantly in the edge region of the image and already disappears completely for the finest structures (446 lp/mm) at the field edge. This circumstance is purely due to the vignetting present.

Figure 11:
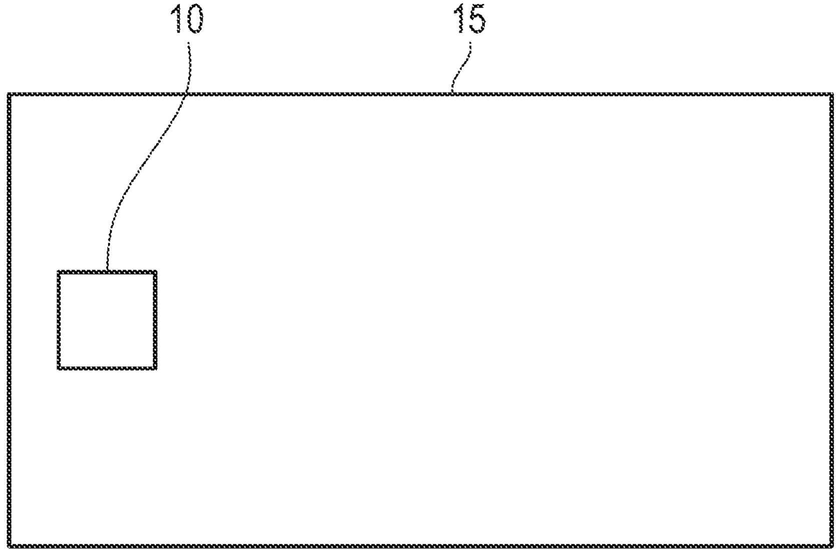
FIG. 11 schematically shows a mobile device according to an exemplary embodiment the disclosure.

FIG. 11 schematically shows a mobile device 15 according to the disclosure. The mobile device 15 includes an optical arrangement 10 according to the disclosure, for example an optical arrangement 10 according to one of the above-described embodiment variants. By way of example, the mobile device 15 can be a cellular telephone, a notebook, a netbook, a smartwatch, etc.

TABLE 1

| FIG. | 2 | 5 | 7 | 9 |
|---|---|---|---|---|
| y' | 8.00 | 8.00 | 8.00 | 8.00 |
| FNO | 2.00 | 2.00 | 1.80 | 1.50 |
| $L_0$ | 8.50 | 8.50 | 8.50 | 8.50 |
| $L_1$ | 14.13 | 14.88 | 14.03 | 13.57 |
| f' | 11.40 | 12.00 | 10.44 | 10.30 |
| $D_M$ | 8.14 | 9.24 | 9.56 | 7.12 |
| $D_1$ | 4.07 | 4.62 | 4.78 | 3.56 |
| $D_L$ | 3.80 | 3.44 | 3.96 | 3.87 |
| $D_m$ | 2.41 | 2.59 | 2.42 | 2.72 |
| A | 0.235 | 0.235 | 0.261 | 0.314 |
| B | 1.662 | 1.751 | 1.651 | 1.596 |
| C | 1.018 | 1.155 | 1.195 | 0.890 |
| F | 1.633 | 1.556 | 1.806 | 1.366 |
| G | 1.948 | 2.035 | 1.601 | 1.572 |

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Lens element
2 Optical axis/center axis
3 Image plane/detector surface
4 Beam path
5 Strehl ratio
6 Contrast of sagittal structures with an image frequency of 112 lp/mm
7 Contrast of sagittal structures with an image frequency of 223 lp/mm
8 Contrast of sagittal structures with an image frequency of 446 lp/mm
10 Optical arrangement
11 Lens
12 Image receiver
13 Detector surface
14 Coverslip
15 Mobile device
16 Contrast of tangential structures with an image frequency of 112 lp/mm
17 Contrast of tangential structures with an image frequency of 223 lp/mm
18 Contrast of tangential structures with an image frequency of 446 lp/mm
21 Lens element
22 Lens element
23 Lens element
24 Lens element
25 Lens element
26 Lens element
27 Lens element
31 Front side
32 Front side
33 Front side
34 Front side
35 Front side
36 Front side
37 Front side
41 Back side
42 Back side
43 Back side
44 Back side
45 Back side
46 Back side

47 Back side

L Installation length y' Half image field diagonal

α Angle of incidence of the chief ray at the image field edge

ω Half field angle

What is claimed is:

1. An optical arrangement for a mobile device, the optical arrangement comprising:

a lens having a front surface; and an image receiver having a detector surface, wherein the optical arrangement defines an image-side numerical aperture NA, wherein the optical arrangement further defines an installation length $L_0$ in a compressed state, wherein the installation length $L_0$ in the compressed state is a total length of the optical arrangement from the front surface of the lens to the detector surface of the image receiver, wherein the installation length $L_0$ in the compressed state is no more than 10 millimeters, wherein the detector surface is a curved detector surface, wherein, in the compressed state, the image receiver has a half diameter y', with the following holding true:

$$\frac{NA \cdot y'}{L_0} > 0.2,$$

and wherein NA denotes the image-side numerical aperture NA, y' denotes the half diameter, and $L_0$ denotes the installation length in the compressed state.

2. The optical arrangement as claimed in claim 1, wherein the image receiver has at least one of a spherically curved detector surface, a conically curved detector surface, an aspherically curved detector surface, or a cylindrically curved detector surface.

3. The optical arrangement as claimed in claim 1, wherein the image receiver has a concavely curved detector surface.

4. The optical arrangement as claimed in claim 1, wherein the curved detector surface has a radius of curvature $R_D$, for which the following holds true:

$$\left|\frac{R_D}{L_0}\right| < 5$$

and wherein $R_D$ denotes the radius of curvature and $L_0$ denotes the installation length in the compressed state.

5. The optical arrangement as claimed in claim 1, wherein the image receiver has the half diameter y' and the lens has a maximum clear optical diameter of a lens element surface $D_L$, with the following holding true:

$$\frac{D_L}{y'} < 1.5,$$

and wherein $D_L$ denotes the maximum clear optical diameter of the lens element surface and y' denotes the half diameter of the image receiver.

6. The optical arrangement as claimed in claim 1, wherein the lens has an optically effective surface with a minimum clear optical half diameter $h_m$, a first optically effective surface with a clear optical half diameter $h_1$ in a beam path, and a last optically effective surface with a clear optical half diameter $h_L$ in the beam path, with the following holding true:

$$\frac{(h_1 + h_2)}{2h_m} > 1.25,$$

and wherein $h_1$ denotes the clear optical half diameter of the first optically effective surface, $h_L$ denotes the clear optical half diameter of the last optically effective surface, and $h_m$ denotes the minimum clear optical half diameter.

7. The optical arrangement as claimed in claim 1, wherein the optical arrangement has a focal length f, with the following holding true:

$$\frac{f}{L_0} > 1,$$

and wherein f denotes the focal length and $L_0$ denotes the installation length in the compressed state.

8. The optical arrangement as claimed in claim 1, wherein the lens includes a plurality of lens elements successively arranged in a beam path of the optical arrangement, and wherein the lens or lens elements of the plurality of lens elements is/are displaceable along a center axis of the optical arrangement between the compressed state and an operating state of the optical arrangement.

9. The optical arrangement as claimed in claim 8, wherein the optical arrangement defines an installation length $L_1$ in an operating state, and wherein the installation length $L_1$ in the operating state of the optical arrangement is at least 12 millimeters.

10. The optical arrangement as claimed in claim 8, wherein the installation length of the optical arrangement is $L_1$ in the operating state, with the following holding true:

$$\frac{L_1}{L_0} > 1.2,$$

and wherein $L_1$ denotes the installation length in the operating state, and $L_0$ denotes the installation length of the optical arrangement in the compressed state.

11. The optical arrangement as claimed in claim 8, wherein the center axis is an axis which runs parallel to a surface normal of the detector surface of the image receiver at a vertex of the image receiver.

12. The optical arrangement as claimed in claim 8, wherein the optical arrangement defines an optical axis, and wherein the center axis runs along the optical axis.

13. The optical arrangement as claimed in claim 1, wherein the lens comprises a plurality of lens elements successively arranged in a beam path, and wherein a first part of the plurality of lens elements is made of crown material and a second part of the plurality of lens elements is made of flint material.

14. The optical arrangement as claimed in claim 13, wherein the lens elements made of the crown material and the lens elements made of the flint material are successively arranged in an alternating fashion.

15. The mobile device, comprising the optical arrangement as claimed in claim 1.

16. The mobile device as claimed in claim 15, wherein the mobile device is at least one of a cellular telephone, a tablet, a notebook, a smartwatch, a netbook, or a monitor.

* * * * *